(12) United States Patent
Spadafora et al.

(10) Patent No.: US 6,561,259 B2
(45) Date of Patent: May 13, 2003

(54) METHOD OF MELTING TITANIUM AND OTHER METALS AND ALLOYS BY PLASMA ARC OR ELECTRON BEAM

(75) Inventors: Frank P. Spadafora, Niles, OH (US); Kuang-O Yu, Highland Heights, OH (US)

(73) Assignee: RMI Titanium Company, Niles, OH (US)

( * ) Notice: Subject to any disclaimer, the term of this patent is extended or adjusted under 35 U.S.C. 154(b) by 0 days.

(21) Appl. No.: 10/041,818

(22) Filed: Oct. 19, 2001

(65) Prior Publication Data

US 2002/0179278 A1 Dec. 5, 2002

Related U.S. Application Data

(60) Provisional application No. 60/258,412, filed on Dec. 27, 2000.

(51) Int. Cl.[7] .......................... B22D 11/10; B22D 27/02
(52) U.S. Cl. ................. 164/488; 164/489; 164/437; 164/439; 164/66.1; 164/469; 164/506; 164/508; 164/509; 164/494; 164/495
(58) Field of Search .................... 164/488, 489, 164/437, 439, 66.1, 469, 506, 508, 509, 494, 495

(56) References Cited

U.S. PATENT DOCUMENTS

| 4,190,404 | A | | 2/1980 | Drs et al. ..................... 425/8 |
| 4,475,205 | A | | 10/1984 | Glauninger et al. .......... 373/48 |
| 5,224,534 | A | | 7/1993 | Shimizu et al. ............. 164/469 |
| 5,291,940 | A | * | 3/1994 | Borofka et al. ............. 164/494 |
| 5,311,655 | A | | 5/1994 | Jager et al. ................. 29/526.3 |
| 5,972,282 | A | * | 10/1999 | Aguirre et al. .............. 266/208 |
| 6,019,812 | A | | 2/2000 | Volas et al. ................ 75/10.19 |
| 6,264,884 | B1 | * | 7/2001 | Grosse et al. ............... 266/241 |

* cited by examiner

*Primary Examiner*—Tom Dunn
*Assistant Examiner*—I.-H. Lin
(74) *Attorney, Agent, or Firm*—Sand & Sebolt

(57) ABSTRACT

A method for hearthless processing of a solid metallic material consisting essentially of titanium or other metal or alloy thereof which includes providing a solid metal block having a processing surface and a base surface and consisting essentially of titanium or a metal, forming a pool of molten metal on the processing surface of the solid metal block provided in step, adding the metallic material to be processed to the pool of molten metal formed in step, and melting the metallic material to be processed, and removing metallic material melted in step from the pool of molten metal.

77 Claims, 9 Drawing Sheets

METHOD OF MELTING TITANIUM AND OTHER METALS AND ALLOYS BY PLASMA ARC OR ELECTRON BEAM

BACKGROUND OF THE INVENTION

1. Technical Field

The present invention relates to specialized metallurgical processes and more particularly to plasma arc cold hearth refining (PACHR) and electron beam cold hearth refining (EBCHR) of titanium or other metals and alloys thereof.

2. Background Information

The prior art discloses a number of processes for the plasma arc cold hearth refining (PACHR) and electron beam cold hearth refining (EBCHR) of titanium and other metals and alloys thereof.

U.S. Pat. No. 5,224,534 to Shimizu, et al., for example, discloses a method of producing a titanium or other metal or titanium or other alloy material by EBCHR which comprises melting the said metallic material and casting a meltable electrode, characterized in that the electrode produced by EBCHR is made by enveloping the said metallic material melted with an enclosure formed from a metallic material having a higher thermal conductivity than said particular metal. The evaporation loss of the alloy element of the said particular metal is compensated by adjusting the input chemistry of the solid particular metal. Titanium sponge or titanium scrap may be produced into a slab with a square cross section and then directly rolling the slab without subjecting the slab to forging before the rolling.

U.S. Pat. No. 6,019,812 to Volas, et al. discloses a PACHR process which provides an ingot of improved properties and including a PACHR furnace operated inside a chamber containing an inert gas, such as helium, 1.1 atm pressure levels. Raw material metals for a desired titanium or titanium alloy composition are supplied to a melting hearth located inside the chamber and heated by a plasma torch which utilizes an inert gas. The plasma arc melts the raw material metal thereby forming a molten pool of metal that is directed to at least one refining hearth. Plasma torches located in the refining hearths maintain the metal in a molten state as it passes through the cold hearth to allow impurities present in the metal to be refined therefrom. After passing through the refining hearths, the molten metal is poured into an ingot mold while still under 1.1 atm inert gas pressure. The molten material is then allowed to cool and solidify into a continuously cast ingot. The thus formed ingot is then subjected to hot working and fabrication operations.

In conventional plasma arc cold hearth refining (PACHR) and electron beam cold hearth refining (EBCHR) of metals such as titanium alloys and superalloys and other metals and their alloys, a water cooled copper hearth is supplied with raw materials in the forms of loose lumps and pieces or premelted fabricated solid bars. This material is melted and refined by plasma arc or electron beam. A solid skull will form when molten metal contacts with the bottom and side wall surfaces of the water cooled copper hearth. A molten metal pool will then form on top of the solid skull. The refined molten metal is poured from the hearth into a cylindrical or rectangular mold to form a continuously cast cylindrical ingot or rectangular slab.

The use of a water cooled copper hearth in a conventional cold hearth furnace (PACHR or EBCHR) has a number of limitations.

One such limitation is that the water cooled hearth removes a significant amount of heat from the molten metal. As a result, high power input from plasma (PACHR) or electron beam (EBCHR) is needed to maintain a desired melting rate and molten metal superheat. Consequently, the thermal efficiency of many prior art systems is low.

Another disadvantage of the prior art methods is that it is necessary to control the heat transfer rate at the bottom and sidewall surfaces of the solid skull. In practice it is found that it is difficult and expensive to effect such control of the heat transfer rate at the bottom and side wall surfaces of the solid skull.

Another disadvantage of the prior art methods is that the water cooled copper hearth, which is used in such methods, is a complex and expensive equipment.

Another disadvantage of the prior art methods is that during operation, the water cooled copper hearth experiences very high temperature gradient which results in high level of thermal stresses. Consequently, the hearth may crack and need expensive repair work. In addition, furnace downtime will also significantly reduce the metal throughput rate.

A still further disadvantage of the method of the prior art is that the setup and exchange of the water cooled copper hearth is a time-consuming work, which reduces overall productivity of the furnace.

SUMMARY OF THE INVENTION

It is an object of the present invention for titanium or other metals or their alloys to provide a simple and inexpensive means of controlling heat transfer rates in a plasma arc cold hearth refining (PACHR) or electron beam cold hearth refining (EBCHR) and allows for simple and inexpensive means of water cooling associated apparatus.

It is another object of the present invention to provide a method of plasma arc cold hearth refining (PACHR) and electron beam cold hearth refining (EBCHR) of titanium and other metals or their alloys which substantially avoid high levels of thermal stress and resulting cracking in associated apparatus.

It is still a further object of the present invention to provide a method for plasma arc cold hearth refining (PACHR) and electron beam cold hearth refining (EBCHR) of titanium and other metals and their alloys which can be accomplished with apparatus which is easily inexpensively and quickly set up and assembled to allow practice of the method.

The present invention comprises a method of hearthless block melting (HLBM) and an apparatus for accomplishing this method.

First a solid metal block having an upper processing surface and a base surface is provided which consists essentially of titanium or other metal or alloy which is to be processed. A plasma arc or electron beam is then used to form a pool of molten metal on the upper processing surface of the metal block. The titanium or other metal or alloy to be processed is then added to the pool of molten metal and is melted. The titanium or other metal or alloy melted in this way is then removed from the pool of molten metal and is poured into an ingot mold to form a cylindrical ingot or rectangular slab.

HLBM uses a solid metal block as the molten metal container. The chemical composition of the block is similar to the ingot/slab to be produced. The equipment that is used to replace the water cooled copper hearth includes a water cooled copper base plate, a reusable block sitting on the base plate, and a water cooled copper pour-lip attached to the block. At the start of the operation, the block is first melted by the plasma arc or electron beam to form a molten pool. The raw material is then added at the one end of the block without the pour-lip. The overflow molten metal is poured into the ingot casting mold through the attached pour-lip. The shape of the block is not limited to rectangular. It can be "C" shaped, "T" shaped, "L" shaped, or small ended rectangular or hexagonal shaped. There is no limitation to the number of plasma torches or electron beam guns to be used for the furnace.

The heat transfer rate between the bottom of the block and the base plate can be reduced to maintain a deeper and bigger molten pool in the block. The block bottom to base plate heat transfer rate can be reduced by either insulating the block bottom or machining out a certain groove pattern at the block bottom to reduce the contacting area between the block bottom surface and the base plate. The insulating material can be any metallic as well as non-metallic foil, sheet, plate, and block. The total surface area of the machined groove pattern can be adjusted to change the block/base plate interface heat transfer rate. For plasma arc cold hearth refining (PACHR), helium gas jet can be introduced to selectively cool the block side walls and prevent molten metal flow out from block side walls. A metal shield guide can be used to protect the helium gas pipeline from the plasma or electron beam heat or overflow molten metal. The block can be clamped with the base plate to maintain a close contact and consistent heat transfer rate between the block bottom.surface and the base plate. At the start of the operation, a solid block of metal with the similar chemical composition of the molten metal to be produced is put into the pour-lip. During the melting operation, the top portion of the solid block will be melted away to allow the molten metal to flow through. The bottom portion of the block will stay solid to prevent molten metal having a direct contact with the water cooled copper base plate and losing superheat.

BRIEF DESCRIPTION OF THE DRAWINGS

The preferred embodiment of the invention, illustrative of the best mode in which applicant contemplated applying the principles, is set forth in the following description and is shown in the drawings and is particularly and distinctly pointed out and set forth in the appended claims.

FIG. 3b is a horizontal view of the block bottom surface from 3b-3b in FIG. 3a;

FIG. 4b is vertical cross sectional end view of the solid phase block and base plate shown in FIG. 4a;

DESCRIPTION OF THE PREFERRED EMBODIMENTS

Figure 1A:
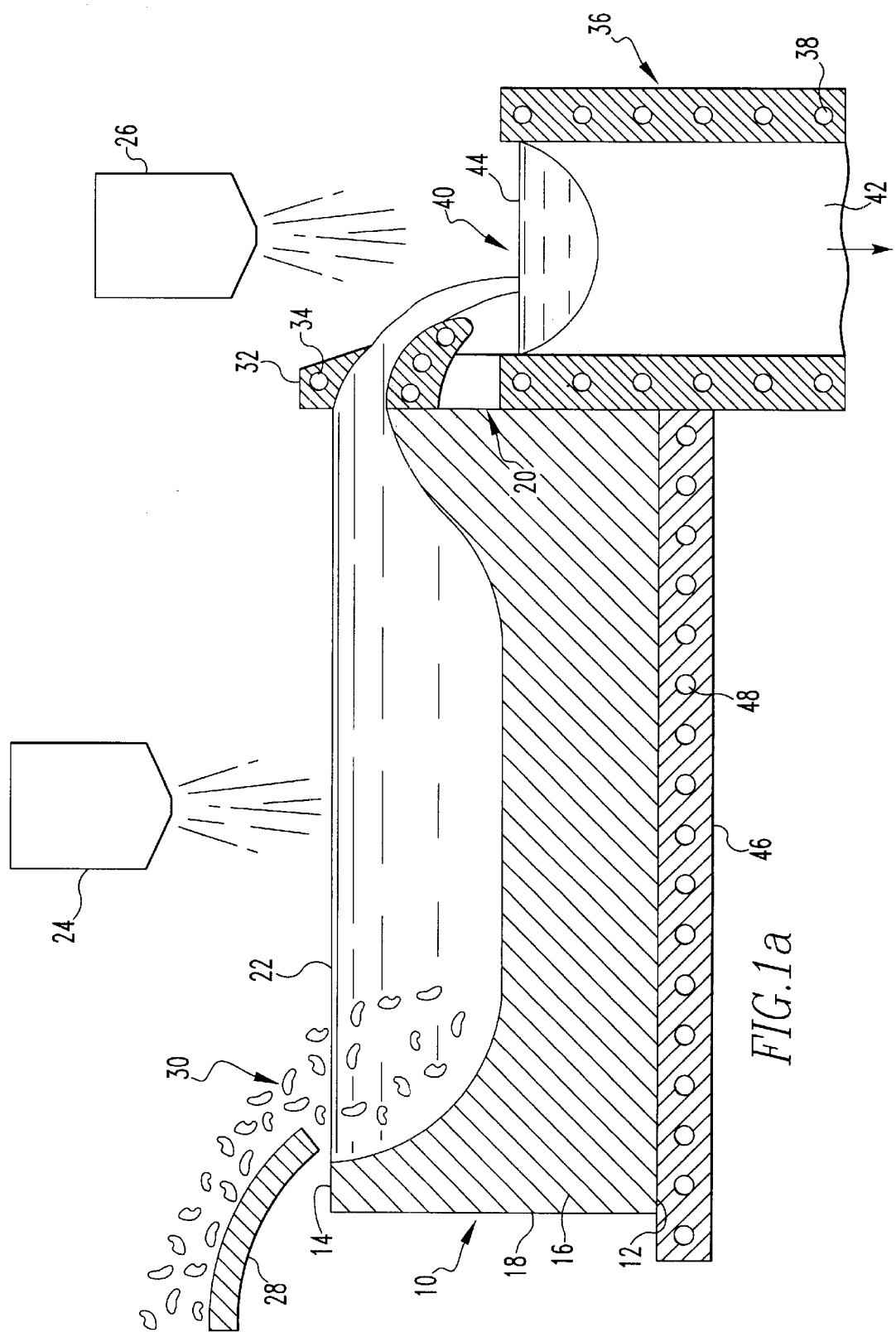
FIG. 1a is a schematic vertical cross sectional view of the apparatus used in the practice of a method representing a preferred embodiment of the present invention.

Referring to FIG. 1a, there is a rhomboid shaped solid block of titanium 10 which has a base surface 12, a top processing surface 14, a pair of lateral surfaces as at surface 16, a rear surface 18, and a front surface 20. On the top processing surface 14, there is a pool of molten titanium 22 which is produced by melting solid titanium by means of a plasma torch or alternatively an electron beam gun 24. There is also a second plasma torch or alternatively an electron beam gun 26. The apparatus also includes an input ramp 28, by means of which solid phase titanium input material 30 enters the pool of molten titanium 22. The apparatus also includes an output lip 32 which is water cooled by means of water tubes as at tube 34. Adjacent the output lip 32 there is a water cooled copper mold 36 which is cooled by means of water tubes as at tube 38. The second plasma torch or electron beam gun 26 is positioned over the mold 36. The mold 36 has a mold interior 40 which includes a solid titanium ingot 42 and an ingot molten pool of titanium 44. Solid phase block 10 rests on an upper base plate 46 which is cooled by means of water tubes as at tube 48. It will be seen that plasma torch or electron beam gun 24 is positioned over processing surface 14 of the block of titanium 10. The plasma torch or electron beam gun 26 is positioned over the mold 36. It will be understood that ordinarily if a plasma torch is used to cover the processing surface 14 of the block of titanium, that a plasma torch will be positioned over the mold 36. If an electron beam generator is positioned over the processing surface 14, then an electron beam generator will be positioned over the mold 36. A suitable plasma torch is commercially available from Retech located at Ukiah, Calif. under model no. RP-75T. A suitable electron beam gun is commercially available from Retech located at Ukiah, Calif. under model no. Bakish E480-30-MOD-100-33. It will also be understood that the pool of molten titanium 22 may be initially formed by melting a portion of the block of titanium on the processing surface 14. Alternatively, the pool of molten titanium 22 may be initially formed by filing a recess on the processing surface 14 with separately melted titanium.

Figure 1B:
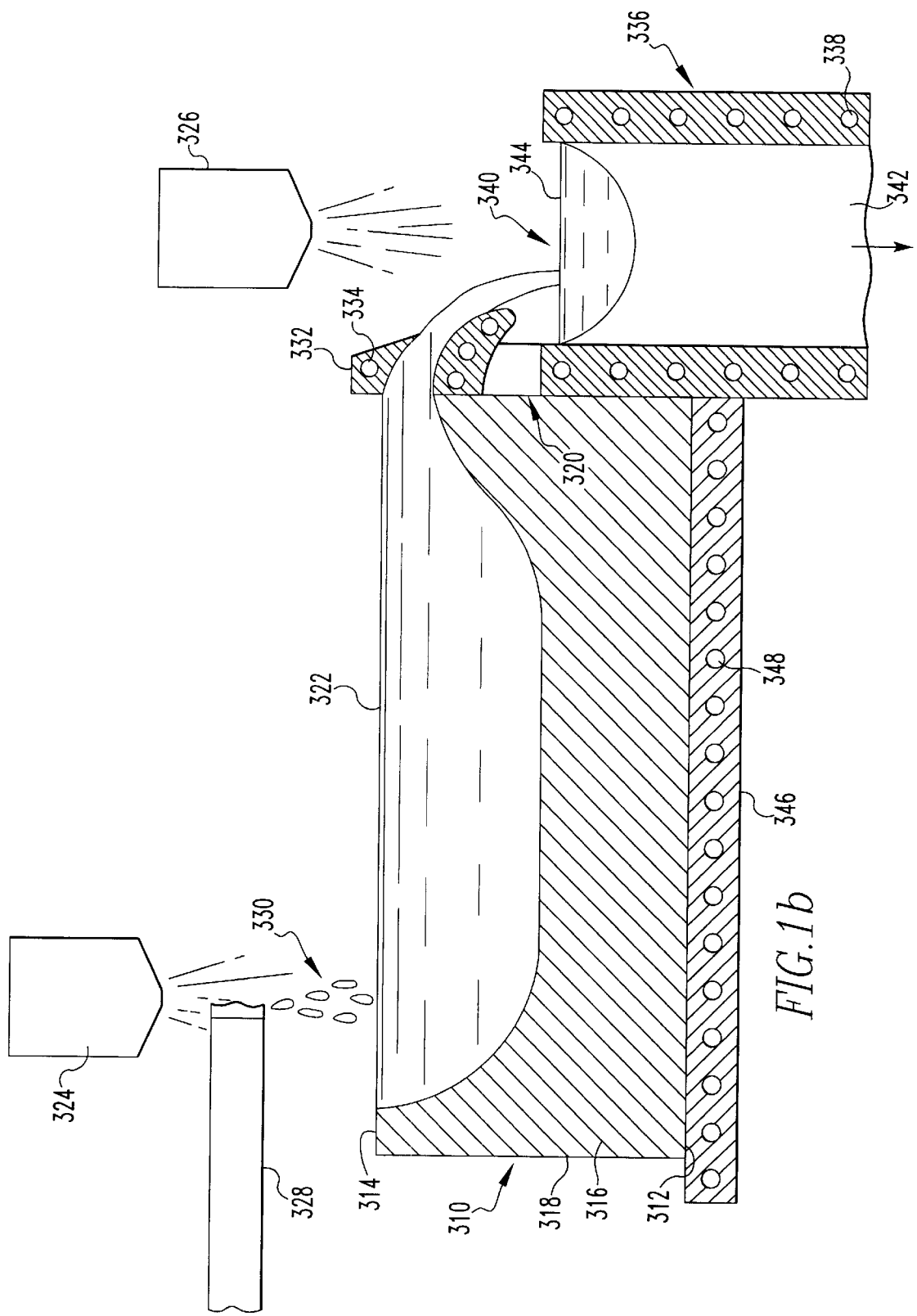
FIG. 1b is a schematic vertical cross sectional view of the apparatus used in the practice of a method representing an alternate preferred embodiment of the present invention.

Referring to FIG. 1b, there is a rhomboid shaped solid block of titanium 310 which has a base surface 312, a top processing surface 314, a pair of lateral surfaces as at surface 316, a rear surface 318, and a front surface 320. On the top processing surface 314, there is a pool of molten titanium 322 which is produced by melting solid titanium by means of a plasma torch or alternatively an electron beam gun 324. There is also a second plasma torch or alternatively an electron beam gun 326. The apparatus also includes a titanium bar 328 to be melted by means of which droplets of liquid phase titanium input material 330 resulting from the melting of bar 328 enter the pool of molten titanium 322. The apparatus also includes an output lip 332 which is water cooled by means of water tubes as at tube 334. Adjacent the output lip 332 there is a water cooled copper mold 336 which is cooled by means of water tubes as at tube 338. The second plasma torch or electron beam gun 326 is positioned over the mold 336. The mold 336 has a mold interior 340 which includes a solid titanium ingot 342 and an ingot molten pool of titanium 344. Solid block 310 rests on an upper base plate 346 which is cooled by means of water tubes as at tube 348. It will be seen that plasma torch or electron beam gun 324 is positioned over processing surface 314 of the block of titanium 310. The plasma torch or electron beam generator 326 is positioned over the mold 336.

Figure 2A:
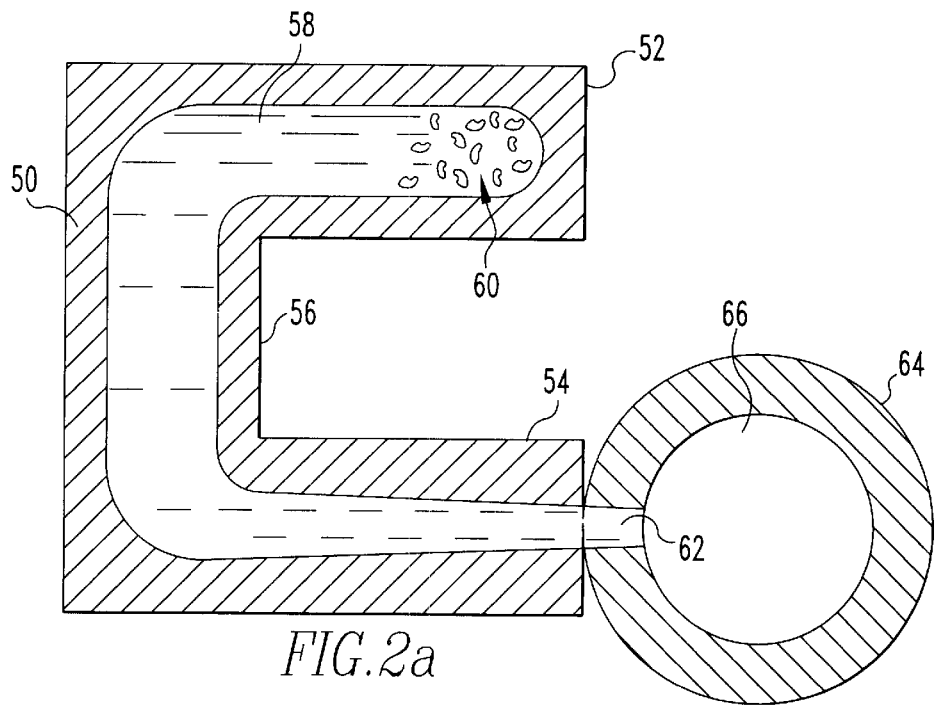
FIG. 2a is a horizontal cross sectional view of the solid block and casting mold used in an alternate preferred embodiment of the present invention.

Referring to FIG. 2a, in an alternate embodiment of the invention, the solid block of titanium 50 is what will be referred to as being generally "C" shaped. This block has a first section 52 and a spaced parallel second section 54. A perpendicular section 56 connects the first section 52 and second section 54. On the upper surface of the block, there is a molten metal pool 58. On the first section 52 there is an input material 60 into the molten metal pool 58. On the second section 54, there is a pour lip 62 from which molten metal is poured into a casting mold 64 to form an ingot 66.

Figure 2B:
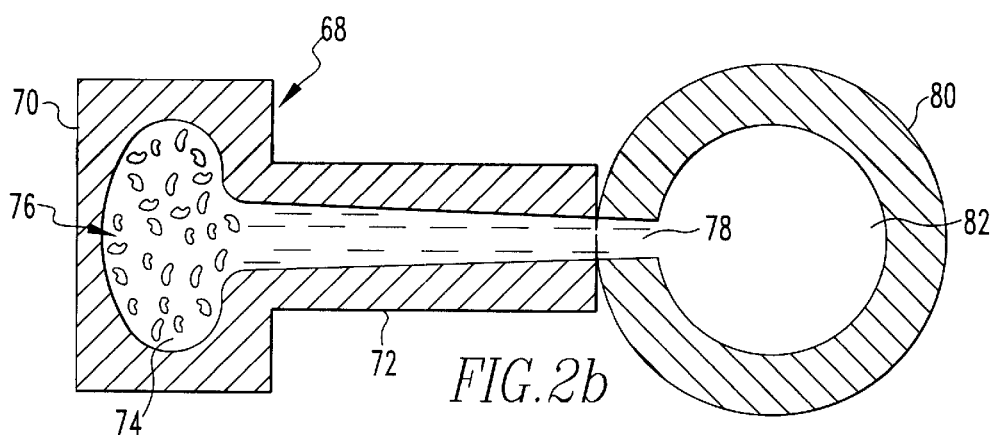
FIG. 2b is a horizontal cross sectional view of another solid block and casting mold used in another preferred embodiment of the present invention.

Referring to FIG. 2b, in another embodiment there is a solid block of titanium 68. This block has a rear section 70 and a front section 72 which is perpendicular to the rear section. On the top surface of the block 68, there is a molten metal pool 74 which at its rear has input material 76 and at its opposed side there is a pour lip 78 from which metal enters an adjacent casting mold 80 to form an ingot 82. Such a shape of the block in which the front section 72 is medially positioned relative to the end section is referred to herein as "T" shaped.

Figure 2C:
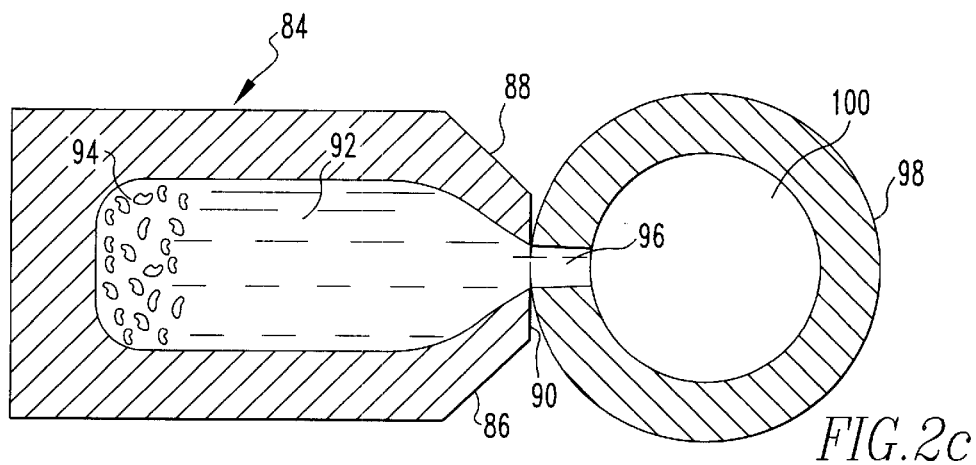
FIG. 2c is a horizontal cross sectional solid block and casting mold used in another preferred embodiment of the present invention.

Referring to FIG. 2c, another embodiment is a hexagonal shaped, solid metal block 84. This block has front sloped shoulders 86 and 88 and a restricted front side 90. On its upper surface it has a molten metal pool 92 with input material 94 adjacent its rear side. There is a pour lip 96 which is adjacent a casting mold 98 in which an ingot 100 is formed.

Figure 2D:
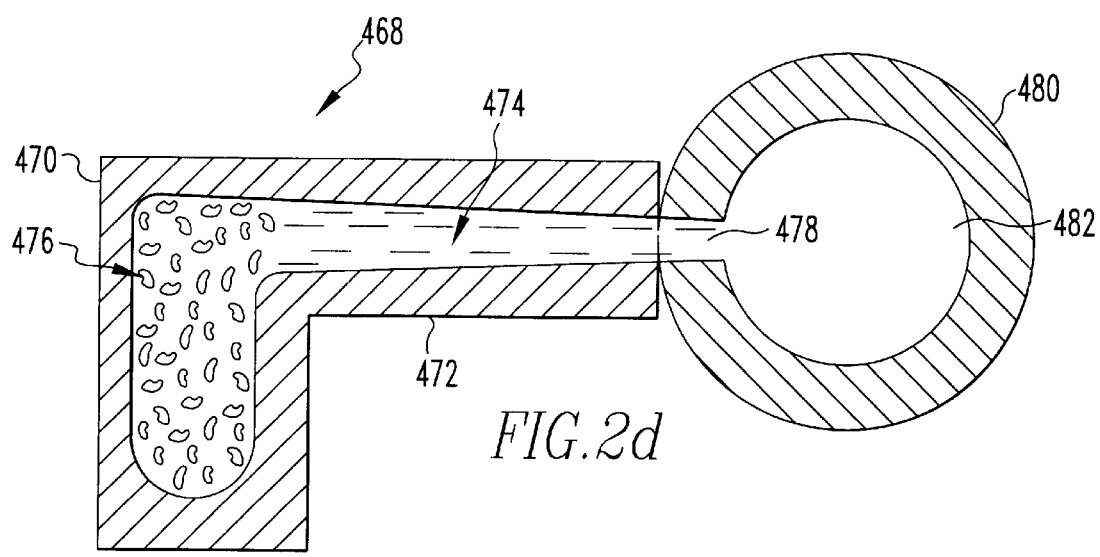
FIG. 2d is a horizontal cross sectional solid block and casting mold used in another preferred embodiment of the present invention.

Referring to FIG. 2d, in another embodiment similar to the above described "T" shaped block there is a solid block of titanium 468. On the top surface of the block 468 there is a molten metal pool 474 which at its rear side 470 has input material 476 and at its opposed side there is a pour lip 478 from which metal enters an adjacent casting mold 480 to form an ingot 482. Such a shape of the block in which the front section 472 is medially positioned relative to the end section is referred to herein as "L" shaped.

Figure 3B:
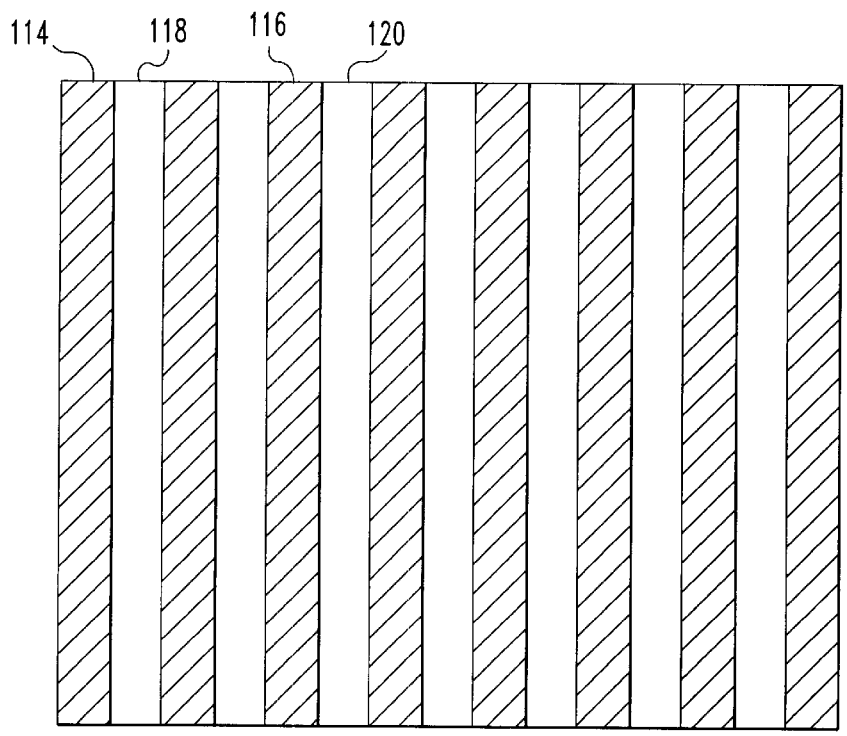
Figure 3A:
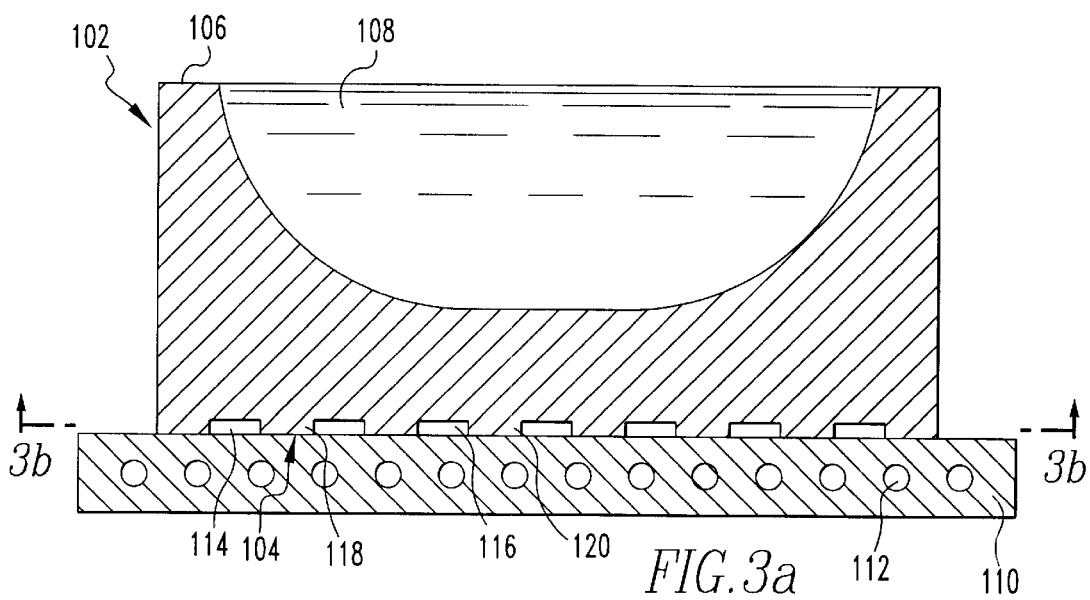
FIG. 3a is a vertical cross sectional view of the solid block and base plate used in another preferred embodiment of the method of the present invention.

Referring to FIGS. 3a and 3b, in another embodiment, there is a solid block of metal 102 which has a base surface 104 and a top processing surface 106. On the top processing surface 106 there is a pool of molten metal 108. Beneath the base surface 104 there is a water cooled copper base plate 110 with a plurality of cooling water tubes as at tube 112. On the base surface 104 of the solid block 102, there are a plurality of machined grooves as at groove 114 and 116. Between the grooves as at grooves 114 and 116, there are a plurality of plate contact projections as at 118 and 120. It would be appreciated that the heat transfer between block 102 and base plate 110 may be adjusted by means of the number, size and pattern of the machined grooves as at groove 114 and 116.

Figure 3C:
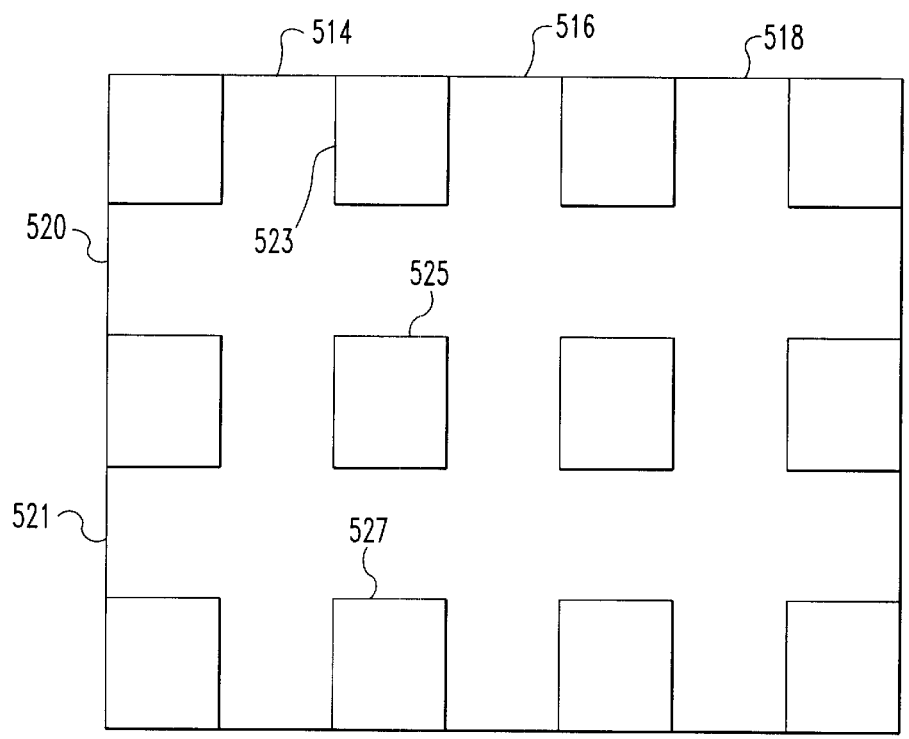
FIG. 3c is a horizontal view of the block bottom surface similar to the one shown in FIG. 3b showing another preferred embodiment of the present invention.

Referring to FIG. 3c, an embodiment which is similar to the embodiment shown in FIGS. 3a and 3b except for the pattern of grooves on the base plate is shown. In this embodiment, there are three traverse grooves 514, 516 and 518 and two longitudinal grooves 520 and 521. This pattern of transverse and longitudinal grooves forms a pattern of solid areas as at areas 523, 525 and 527.

Figure 3D:
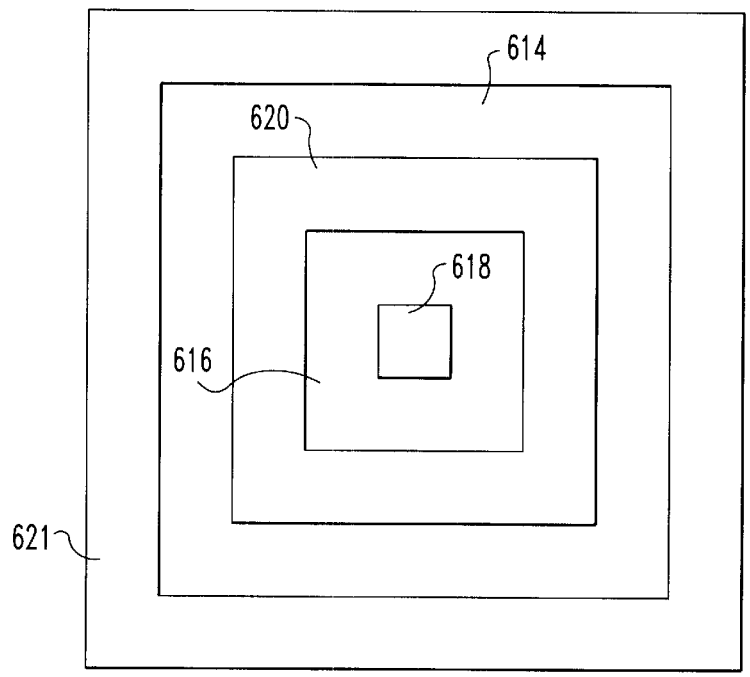
FIG. 3d is a horizontal view similar of the block bottom surface to the one shown in FIG. 3b showing another preferred embodiment of the method of the present invention.

Referring to FIG. 3d, another embodiment which is similar to the embodiment shown in FIGS. 3a and 3b except for the pattern of the grooves is shown. There are two concentric continuous grooves 614 and 616. This pattern of concentric grooves form a patter of concentric solid areas 618, 620 and 621.

Figure 3E:
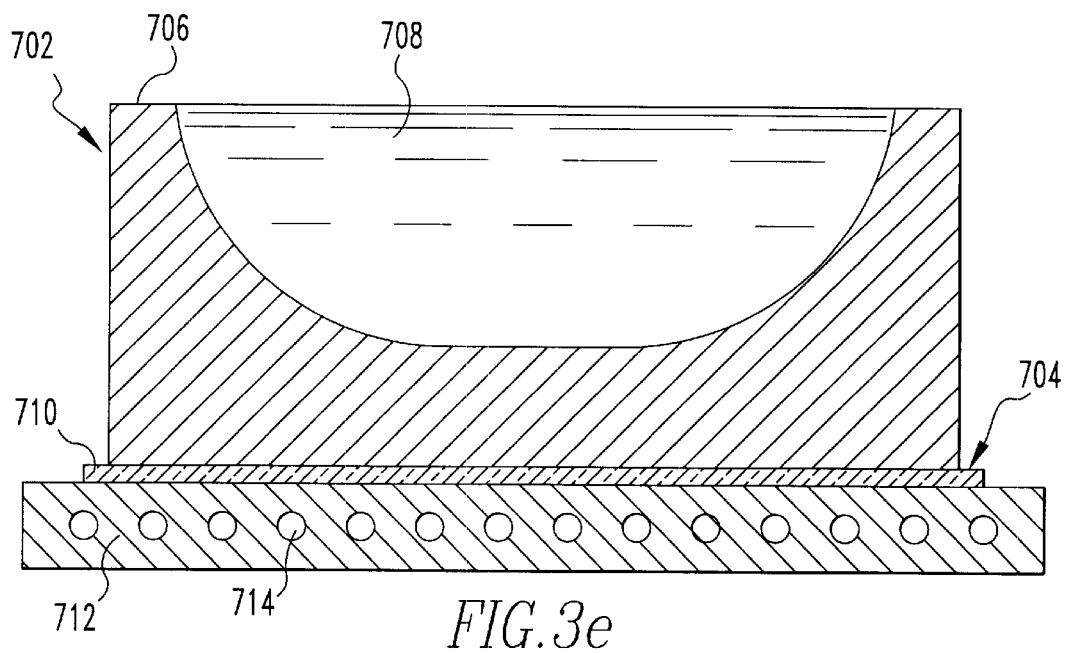
FIG. 3e is a vertical cross sectional view of the solid block and base plate used in another preferred embodiment of the present invention.

Referring to FIG. 3e, in another embodiment, there is a solid block of metal 702 which has a base surface 704 and a top processing surface 706. On the top processing surface 706 there is a pool of molten metal 708. Beneath the base surface 704 there is an insulating sheet 710 which can be made from various materials such as metal sheet, non-metallic fibers, and ceramic plate. Beneath the insulating sheet 710 there is a water cooled copper base plate 712 with a plurality of cooling water tubes as at the tube 714.

Figure 4B:
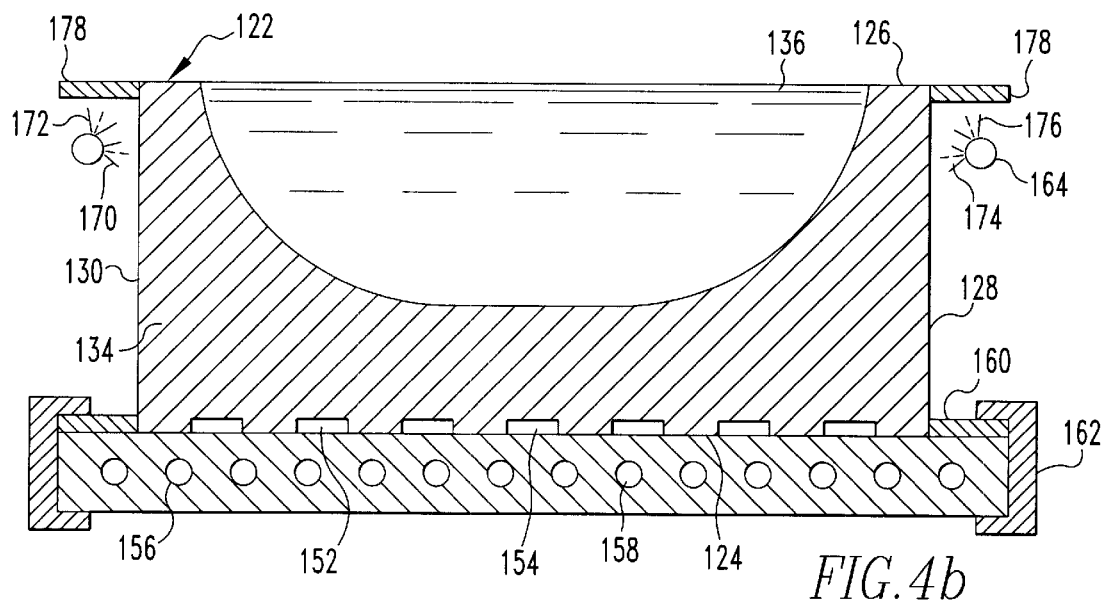
Figure 4A:
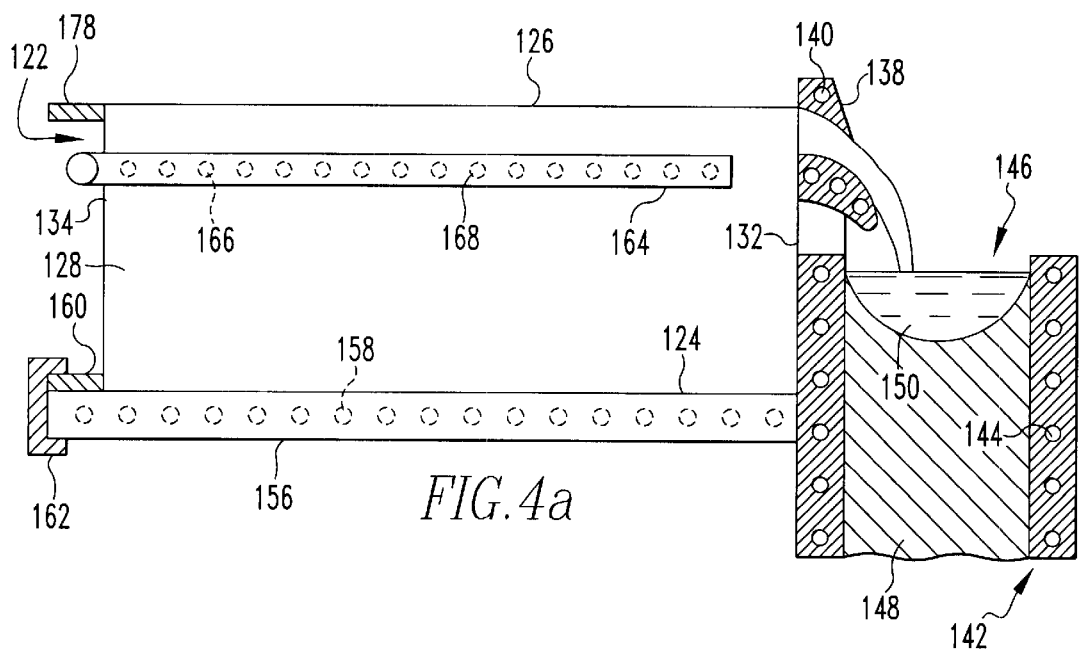
FIG. 4a is a schematic side elevational and partial vertical cross sectional view of a solid phase block, base plate and ingot mold used in another preferred embodiment of the method of the present invention.

Referring to FIGS. 4a and 4b, in another embodiment, there is a solid block of titanium 122 which has a base surface 124 and top processing surface 126. This block also has lateral surfaces 128 and 130 and a front side 132 and a rear side 134. On the top processing surface 126, there is a molten metal pool 136 with a water cooled output lip 138 which is cooled by means of cooling water tubes as at tube 140. Adjacent the output lip 138, there is a water cooled mold 142 which includes cooling water tubes as at tube 144 and which has a mold interior 146 in which there is formed a solid ingot 148 beneath an ingot molten metal pool 150. The base surface 124 of the solid block 122 has a plurality of machined grooves as at grooves 152 and 154 and the base surface 124 is superimposed on a water cooled copper base plate 156 which has a plurality of water tubes as at tube 158. Superimposed on the water cooled copper base plate 156 is a block side plate 160 which is fixed to the water cooled copper base plate 156 by means of clamp 162. For plasma arc cold hearth cold hearth refining (PACHR) adjacent the lateral surfaces 128 and 130 and the rear side 134 of the solid block, there is a helium gas pipeline 164 with holes for helium release on the inner and upper side as at holes 166 and 168. Such holes produce helium gas jets 170, 172, 174, and 176. Above the helium gas pipeline 164, there is a shield 178.

Figure 5C:
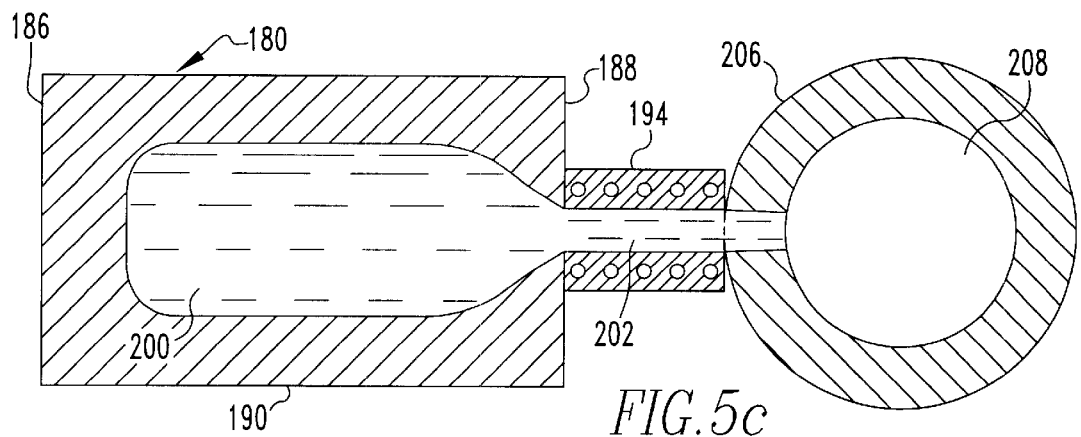
FIG. 5c is a schematic horizontal cross sectional view of the block shown in FIG. 5b along with the ingot mold.
Figure 5A:
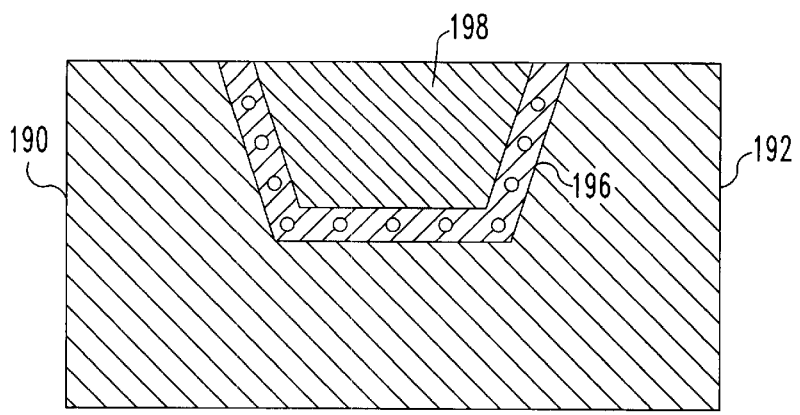
FIG. 5a is a schematic vertical cross sectional end view of a solid block illustrating a first step in another preferred embodiment of the method of the present invention.
Figure 5B:
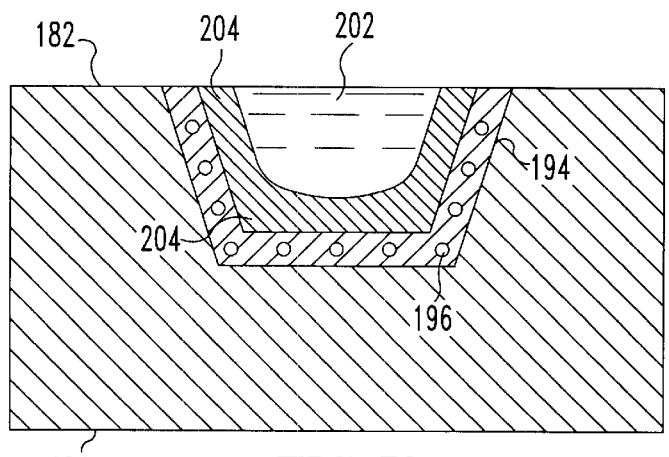
FIG. 5b is a schematic vertical cross sectional end view similar to FIG. 5a a second step in another preferred embodiment of the method of the present invention.

Referring to FIG. 5a, the apparatus used in a preferred embodiment of the method of the present invention is shown before melting. Referring to FIGS. 5b and 5c, this apparatus is shown during melting. This apparatus has a solid titanium block 180 with a top surface 182 and a base surface 184. The block 180 also has a rear end 186 and front end 188. Surfaces 190 and 192 and a pour lip 194 which is water cooled by cooling watertubes as at tube 196. Before melting in the pour lip 194 there is solid phase metal 198 as is shown in FIG. 5*a*. FIGS. 5*b* and 5*c* shows the block with a molten metal pool 200, and molten metal flow 202 through the pour lip 194. Adjacent the pour lip 194 there is a solid skull 204. Adjacent pour lip 194 there is a mold 206 with an ingot 208.

The method and apparatus described above may be used for the hearthless melting of superalloys including nickel based, iron based and cobalt based superalloys. The method and apparatus described above may also be used for the hearthless melting of molybdenum, tantalum, hafnium and zirconium as well as alloys of the aforesaid metals.

The method of the present invention is further described with reference to the following examples.

EXAMPLE 1

A Ti-6Al4V titanium alloy block having dimensions of 14"×7"×3" and a weight of 48 lbs. was heated on its upper surface by means of a 150 kW helium plasma torch to a temperature above the Ti-6Al1-4V melting point for a period of 10 minutes until a molten pool of the capacity of approximately 100 cu. in. was formed. Ti-6Al1-4V sponge compacts having approximate dimensions of 4"×3"×2" were added to the pool at a rate of 0.75 lbs./min. Molten metal was discharged from a pour lip into an ingot at a rate of 0.75 lbs./min.

EXAMPLE 2

A Ti-6Al1-4V titanium alloy block having dimensions of 14"×7"×3" and a weight of 48 lbs. is heated on its upper surface by means of a 150 kW helium plasma torch to a temperature above the Ti-6Al-4V melting point for a period of 10 minutes until a molten pool of the capacity of approximately 100 cu. in. is formed. A Ti-6Al-4V feeder bar is positioned at a distance of 4" above the molten pool so that one end was directly above the pool. The end directly above the pool is heated with the same 150 kW helium plasma torch to above the Ti-6Al-4V melting point. Droplets of molten metals having an approximate weight of 0.75 lbs./min. are allowed to fall directly into the molten pool so that they remain in the liquid phase during the entire fall period. Molten metal is discharged from a pour lip into an ingot at a rate of 0.75 lbs./min.

EXAMPLE 3

A Ti-6Al-4V titanium alloy block having dimensions of 14"×9"×4" and a weight of 82 lbs. and which had 0.05" wide by 1/16" deep grooves machined evenly spaced on its bottom surface to reduce the surface area by 50% was heated on its upper surface by means of a 150 kW helium plasma torch to a temperature above the Ti-6Al-4V melting point for a period of 10 minutes until a molten pool of the capacity of approximately 170 cu. in. was formed. Titanium sponge compacts having approximate dimensions of 4"×3"×2" were added to the pool at a rate of 1.1 lbs./min. Molten metal was discharged form a pour lip into an ingot at a rate of 1.1 lbs./min.

EXAMPLE 4

A Ti-6Al-4V titanium alloy block having dimensions of 14"×9"×4" and a weight of 82 lbs. and which has 0.05" wide by 1/16" deep grooves machined evenly spaced on its bottom surface to reduce the surface area by 50% is heated on its upper surface by means of a 150 kW helium plasma torch to a temperature above the Ti-6Al-4V melting point for a period of 10 minutes until a molten pool of the capacity of approximately 170 cu. in. is formed. A line is transporting helium gas under a pressure of 55 psi is peripherally positioned around the block and helium gas is discharged onto the block in 30 equally spaced jets at a distance of from 0.1 inches at a rate of 10 cu. ft./min. Titanium sponge compacts having approximate dimensions of 4"×3"×2" are added to the pool at a rate of 1.1 lbs./min. Molten metal is discharged form a pour lip into an ingot at a rate of 1.1 lbs./min.

EXAMPLE 5

A IN718 nickel based superalloy block having dimensions of 14"×7"×3" and a weight of 94 lbs. is heated on its upper surface by means of a 150 kW helium plasma torch to a temperature above the IN718 melting point for a period of 10 minutes until a molten pool of the capacity of approximately 100 cu. in. is formed. IN718 scraps are added to the pool at a rate of 0.51 lbs./min. Molten metal is discharged from a pour lip into an ingot at a rate of 0.51 lbs./min.

EXAMPLE 6

A molybdenum alloy block having dimensions of 14"×7"×3" and a weight of 108 lbs. is heated on its upper surface by means of a 150 kW helium plasma torch to a temperature above the molybdenum alloy melting point for a period of 10 minutes until a molten pool of the capacity of approximately 100 cu. in. is formed. Molybdenum alloy scraps are added to the pool at a rate of 0.41 lbs./min. Molten metal is discharged from a pour lip into an ingot at a rate of 0.41 lbs./min.

EXAMPLE 7

A tantalum alloy block having dimensions of 14"×7"×3" and a weight of 176 lbs. is heated on its upper surface by means of a 150 kW helium plasma torch to a temperature above the tantalum alloy melting point for a period of 10 minutes until a molten pool of the capacity of approximately 100 cu. in. is formed. Tantalum alloy scraps are added to the pool at a rate of 0.41 lbs./min. Molten metal is discharged from a pour lip into an ingot at a rate of 0.41 lbs./min.

EXAMPLE 8

A hafnium alloy block having dimensions of 14"×7"×3" and a weight of 141 lbs. is heated on its upper surface by means of a 150 kW helium plasma torch to a temperature above the hafnium alloy melting point for a period of 10 minutes until a molten pool of the capacity of approximately 100 cu. in. is formed. Hafnium alloy scraps are added to the pool at a rate of 0.58 lbs./min. Molten metal is discharged from a pour lip into an ingot at a rate of 0.58 lbs./min.

EXAMPLE 9

A zirconium alloy block having dimensions of 14"×7"×3" and a weight of 69 lbs. is heated on its upper surface by means of a 150 kW helium plasma torch to a temperature above the zirconium alloy melting point for a period of 10 minutes until a molten pool of the capacity of approximately 100 cu. in. is formed. Zirconium alloy scraps are added to the pool at a rate of 0.88 lbs./min. Molten metal is discharged from a pour lip into an ingot at a rate of 0.88 lbs./min.

EXAMPLE 10

A Ti-6Al-4V alloy having dimensions of 14"×7"×3" and a weight of 48 lbs. is heated on its upper surface by means of a 150 kW electron beam gun to a temperature above the Ti-6Al-4V melting point for a period of 10 minutes until a molten pool of the capacity of approximately 100 cu. in. is formed. Ti-6Al-4V sponge compacts having approximate dimensions of 4"×3"×2" is added to the pool at a rate of 0.75 lbs./min. Molten metal is discharged from a pour lip into an ingot at a rate of 0.75 lbs./min.

EXAMPLE 11

A iron based superalloy having dimensions of 14"×7"×3" and a weight of 83 lbs. is heated on its upper surface by means of a 150 kW electron beam gun to a temperature above the iron based superalloy melting point for a period of 10 minutes until a molten pool of the capacity of approximately 100 cu. in. is formed. A 5" diameter iron based superalloy feeder bar is positioned at a distance of 4" above the molten pool so that one end is directly above the pool. The end directly above the pool is heated with the same 150 kW electron beam gun to above the iron based superalloy melting point. Droplets of molten metals having an approximate weight of 0.58 lbs./min. are allowed to fall directly into the molten pool so that they remain in the liquid phase during the entire fall period. Molten metal is discharged from a pour lip into an ingot at a rate of 0.58 lbs./min.

EXAMPLE 12

A cobalt based superalloy having dimensions of 14"×7"×3" and a weight of 78 lbs. is heated on its upper surface by means of a 150 kW electron beam gun to a temperature above the cobalt based superalloy melting point for a period of 10 minutes until a molten pool of the capacity of approximately 100 cu. in. is formed. A 5" diameter cobalt based superalloy feeder bar is positioned at a distance of 4" above the molten pool so that one end is directly above the pool. The end directly above the pool is heated with the same 150 kW electron beam gun to above the cobalt based superalloy melting point. Droplets of molten metals having an approximate weight of 0.53 lbs./min. are allowed to fall directly into the molten pool so that they remain in the liquid phase during the entire fall period. Molten metal is discharged from a pour lip into an ingot at a rate of 0.53 lbs./min.

The term "block" as used herein means a mass of titanium or other metal or an alloy thereof which is of any regular or irregular shape and which may have either planar or irregular surfaces and which may have interior cavities.

The term "processing surface" as it is used herein means any surface on a block of metal which is in the horizontal plane or which has some other angular orientation which would allow the formation of a liquid pool therein.

It will also be appreciated by those skilled in the art that, while the processing surface on which the pool of molten metal is formed on the block will ordinarily be an upper surface, it would be possible, within the scope of this invention, to use other surfaces on a block as such a processing surface on which the pool of molten titanium may be formed. Non-limiting examples of surfaces which may be the processing surface other than as the top surface of a block would include a sloped lateral surface or an interior surface in a cavity in the block.

The terms "solid" or "solid block" as used herein refer to metal which is in the solid state of matter. Any block having interior cavities or bores or which may otherwise be described as hollow will still be considered to be "solid" as long as the block is comprised of metal in its solid phase.

The term "alloy" as used herein means any material comprising either two or more metals or one or more metals and a nonmetal. This term is further intended to encompass both compounds and mixtures. The term is also intended to encompass solid solutions in which two or more components of a crystalline material are mixed so that ions, atoms or molecules of one component replaces some of the ions, atoms or molecules of the other component in its normal crystal lattice, or in which such ions, atoms or molecules of one component occupy interstitial positions in the normal crystal lattice of the other component.

The term "superalloy" as used herein means any alloy based on a Group VIII element (per usual United States convention or Groups 8–10 under IUPAC 1980 Recommendation) and which may ordinarily comprise various combinations of nickel, iron, cobalt and chromium as well as lesser amounts of tungsten, titanium, niobium, tantalum or hafnium and which is resistant to mechanical stresses and chemical degradation after extended exposure above 1200° F. and more preferably above 2000° F.

It will be appreciated that a method and apparatus for efficiently melting and processing titanium and other metals and their alloys has been described.

It will be appreciated that a method and apparatus has also been described which allows for efficient heat transfer during melting and processing of titanium and other metals and their alloys.

It will also be appreciated that a method and apparatus has been described which allows for efficient cooling of the block sidewall during melting and processing of titanium and other metals and their alloys by plasma arc cold hearth refining (PACHR).

It will also be appreciated that a method and apparatus has been described which avoids very high temperature gradients and thermal stresses and cracking in the water cooled copper hearth during the melting and processing of titanium and other metals and their alloys.

It will finally be appreciated that a method and apparatus has been described for the melting and processing of titanium and other metals and their alloys which allows for a quick, easy and inexpensive apparatus set up and assembly for such procedures.

Accordingly, the improved METHOD OF MELTING TITANIUM AND OTHER METALS AND ALLOYS BY PLASMA ARC OR ELECTRON BEAM is simplified, provides an effective, safe, inexpensive, and efficient method and device which achieves all the enumerated objectives, provides for eliminating difficulties encountered with prior methods and devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the METHOD OF MELTING TITANIUM AND OTHER METALS AND ALLOYS BY PLASMA ARC OR ELECTRON BEAM is practiced, constructed and used, the characteristics of the method and construction, and the advantageous new and useful results obtained; the new and useful steps, structures, devices, elements, arrangements, parts, and combinations are set forth in the appended claims.

What is claimed is:

1. A method for hearthless melting of a solid metallic material to be processed comprised of a metal, comprising the steps of:
   (a) providing a solid metal block having a processing surface and a base surface and comprised of a metal;
   (b) forming a pool of molten metal on the processing surface of the solid metal block provided in step (a);
   (c) adding the metallic material to be processed to the pool of molten metal formed in step (b), and melting the metallic material to be processed; and
   (d) removing metallic material melted in step (c) from the pool of molten metal.

2. The method of claim 1 wherein the metal is selected from the group consisting of titanium and alloys thereof, superalloys, molybdenum and alloys thereof, tantalum and alloys thereof, hafnium and alloys thereof, and zirconium and alloys thereof.

3. The method of claim 2 wherein the metal is selected from the group consisting of titanium and alloys thereof.

4. The method of claim 1 wherein in step (a) the solid metal block is generally rhomboid in shape.

5. The method of claim 1 wherein in step (b) the pool is formed by melting a portion of the solid metal block provided in step (a).

6. The method of claim 1 wherein the solid metal block provided in step (a) has a recess in its processing surface and molten metal is added to said recess to form the molten pool in step (b).

7. The method of claim 1 wherein the block of solid metal provided in step (a) has a recess in its processing surface and the solid metallic material to be processed is emplaced in said recess and then melted to form the pool of molten metal of step (b).

8. The method of claim 1 wherein in step (c) the metallic material to be processed is melted after being emplaced in the pool of molten metal.

9. The method of claim 1 wherein in step (c) the metallic material to be processed is melted before being emplaced in the pool of molten metal.

10. The method of claim 1 wherein in step (c) the metallic material to be processed is continuously added to the pool of molten metal and in step (d) molten metal is continuously removed.

11. The method of claim 1 wherein the processing surface of the solid block is a top surface.

12. The method of claim 1 wherein the base surface of the solid block is a bottom surface.

13. The method of claim 1 wherein the solid block has a molten metal discharge means for removing the metal melted in step (e).

14. The method of claim 13 wherein the molten metal discharge means is a pour lip.

15. The method of claim 14 wherein a molten metal receiving means is provided adjacent the pour lip.

16. The method of claim 15 wherein the molten metal receiving means is a water cooled copper mold which is provided adjacent the pour lip.

17. The method of claim 15 wherein melted material to be processed is discharged through the discharge means to the molten metal receiving means.

18. The method of claim 15 wherein melted metallic material to be processed is discharged from the pour lip to the water cooled copper mold.

19. The method of claim 15 wherein there is metal in the pour lip and said metal is solid adjacent the lip and molten remote from the lip.

20. The method of claim 1 wherein the metallic material to be processed is melted by an electron beam gun.

21. The method of claim 1 wherein means are provided for cooling the solid block.

22. The method of claim 21 wherein the means for cooling the block is a water cooled base plate on which the base surface of the solid block is superimposed.

23. The method of claim 22 wherein the water cooled base plate is comprised of a metal.

24. The method of claim 22 wherein insulation means is interposed between the solid block and the base plate.

25. The method of claim 24 wherein the insulation means is metallic.

26. The method of claim 24 wherein the insulation means is non-metallic.

27. The method of claim 24 wherein clamping means are provided between the solid block and the base plate.

28. The method of claim 22 wherein there are a plurality of grooves on the base of the solid block.

29. The method of claim 22 wherein clamping means are provided between the solid block and the base plate.

30. The method of claim 28 wherein the grooves have a surface area and said surface area has a heat transfer rate between the solid block and the base plate and the surface area of the grooves is adjusted to adjust the heat transfer rate between the solid block and the base plate.

31. The method of claim 1 wherein the metallic material to be processed is melted with a plasma torch.

32. The method of claim 1 wherein the solid block is "C" shaped.

33. The method of claim 1 wherein the solid block is "T" shaped.

34. The method of claim 1 wherein the solid block is "L" shaped.

35. The method of claim 1 wherein the solid block is hexagonally shaped.

36. The method of claim 35 wherein the solid block has opposed ends and is restricted at one end.

37. The method of claim 1 wherein an inert gas jet cools a solid block side wall and prevents molten metal overflow.

38. The method of claim 37 wherein the inert gas is selected from the group consisting of helium and argon and mixtures thereof.

39. A method for hearthless melting of a solid phase titanium material to be processed selected from the group consisting of titanium and alloys thereof, comprising the steps of:
   (a) providing a solid block of the titanium material having a processing surface and a base surface;
   (b) forming a pool of molten titanium material on the processing surface of the solid block provided in step (a);
   (c) adding the titanium material to be processed to the pool of molten titanium material formed in step (b), and melting the titanium material to be processed; and
   (d) removing the titanium material melted in step (c) from the pool of molten titanium material.

40. A method for hearthless melting of a solid titanium material to be processed selected from the group consisting of titanium and alloys thereof, comprising the steps of:
   (a) providing a solid block of the titanium material having a processing surface and a base surface;
   (b) forming a pool of molten titanium material on the processing surface of the solid block provided in step (a);
   (c) melting the titanium material to be processed and adding the titanium material to be processed to the pool of molten titanium material formed in step (b); and (d) removing the titanium material melted in step (c) from the pool of molten titanium material.

41. An apparatus for hearthless melting of a solid metallic material to be processed comprised of a metal, comprising:
  a solid metal block having a processing surface and a base surface and comprised of a metal;
  means for melting metal to form a pool of molten metal on the processing surface of the solid metal block;
  means for adding the metallic material to be processed to the pool of molten metal; and
  means for removing the metallic material to be processed from the pool of molten metal.

42. The apparatus of claim 41 wherein the solid metal block is comprised of a metal selected from the group consisting of titanium and alloys thereof, superalloys, molybdenum and alloys thereof, tantalum and alloys thereof, hafnium and alloys thereof, zirconium and alloys thereof.

43. The apparatus of claim 42 wherein the solid phase metal block is selected from the group consisting of titanium and alloys thereof.

44. The apparatus of claim 41 wherein the means for melting metal is a plasma arc torch.

45. The apparatus of claim 41 wherein the means for melting metal is an electron beam gun.

46. The apparatus of claim 41 wherein the means for removing the metallic material to be processed from the pool of molten metal is a pour lip.

47. The apparatus of claim 41 wherein an inert gas jet cools a solid block side wall and prevents molten metal overflow.

48. The apparatus of claim 47 wherein the inert gas is selected from the group consisting of helium and argon and mixtures thereof.

49. The apparatus of claim 41 wherein the solid metal block is generally rhomboid in shape.

50. The apparatus of claim 41 wherein the pool is formed by melting a portion of the solid metal block.

51. The apparatus of claim 41 wherein the solid metal block has a recess in its processing surface and molten metal is added to said recess to form the molten pool.

52. The apparatus of claim 41 wherein the processing surface of the solid block is a top surface.

53. The apparatus of claim 41 wherein the base surface of the solid block is a bottom surface.

54. The apparatus of claim 41 wherein the means for melting metal is a plasma torch.

55. The apparatus of claim 41 wherein the means for melting metal is an electron beam gun.

56. The apparatus of claim 41 wherein means are provided for cooling the solid block.

57. The apparatus of claim 41 wherein the solid block is "C" shaped.

58. The apparatus of claim 41 wherein the solid block is "T" shaped.

59. The apparatus of claim 41 wherein the solid block is "L" shaped.

60. The apparatus of claim 41 wherein the solid block is hexagonally shaped.

61. The apparatus of claim 60 wherein the solid block has opposed ends and is restricted at one end.

62. The apparatus of claim 41 wherein the means for cooling the block is a water cooled base plate on which the base surface of the solid block is superimposed.

63. The apparatus of claim 62 wherein the water cooled base plate is comprised of a metal.

64. The apparatus of claim 62 wherein insulation means is interposed between the solid block and the base plate.

65. The apparatus of claim 64 wherein the insulation means is metallic.

66. The apparatus of claim 64 wherein the insulation means is non-metallic.

67. The apparatus of claim 64 wherein clamping means are provided between the solid block and the base plate.

68. The apparatus of claim 62 wherein clamping means are provided between the solid block and the base plate.

69. The apparatus of claim 62 wherein there are a plurality of grooves on the base of the solid block.

70. The apparatus of claim 69 wherein the grooves have a surface area and said surface area has a heat transfer rate between the solid block and the base plate and the surface area of the grooves is adjusted to adjust the heat transfer rate between the solid block and the base plate.

71. The apparatus of claim 41 wherein a molten metal discharge means is positioned adjacent the pour lip.

72. The apparatus of claim 71 wherein the molten metal receiving means is a water cooled copper mold.

73. The apparatus of claim 71 wherein there is metal in the pour lip and said metal is solid adjacent the lip and molten remote from the lip.

74. The apparatus of claim 41 wherein the means for adding the metallic material to be processed to the pool of molten metal is a ramp for conveying solid phase material to be processed into the pool of molten metal.

75. The apparatus of claim 41 wherein the means for adding the metallic material to be processed to the pool of molten metal is a bar of the material to be processed which is suspended over the pool of molten metal to allow droplets of molten metal to fall into the pool of molten metal.

76. An apparatus for hearthless melting of a solid titanium material to be processed selected from the group consisting of titanium and alloys thereof, comprising:
  a solid titanium material block having a processing surface and a base surface;
  means for melting titanium material to form a pool of molten metal on the processing surface of the solid titanium material block;
  a ramp for adding solid titanium material to be processed to the pool of molten titanium material; and
  means for removing the titanium material to be processed from the pool of molten titanium material.

77. An apparatus for hearthless melting of a solid titanium material to be processed selected from the group consisting of titanium and alloys thereof, comprising:
  a solid titanium material block having a processing surface and a base surface;
  means for melting titanium material to form a pool of molten metal on the processing surface of the solid titanium material block;
  a solid titanium material article suspended over the pool of molten metal;
  means for melting the solid titanium material article to form droplets of the titanium material so that said droplets fall into said pool; and
  means for removing the titanium material to be processed from the pool of molten titanium material.

* * * * *